United States Patent [19]
Beckner

[11] Patent Number: 5,912,639
[45] Date of Patent: Jun. 15, 1999

[54] GROUND PENETRATING RADAR WITH SYNTHESIZED END-FIRE ARRAY

[75] Inventor: Frederick L. Beckner, Palo Alto, Calif.

[73] Assignee: Power Spectra, Inc., Sunnyvale, Calif.

[21] Appl. No.: 08/861,817

[22] Filed: May 23, 1997

[51] Int. Cl.[6] ............................. G01V 3/12; G01S 13/88
[52] U.S. Cl. ............................. 342/22; 342/27; 342/176
[58] Field of Search ................................. 342/22, 25, 27, 342/176, 179

[56] References Cited

U.S. PATENT DOCUMENTS

| | | | |
|---|---|---|---|
| 4,075,635 | 2/1978 | Unz | 343/844 |
| 4,121,209 | 10/1978 | Ap Rhys | 342/161 |
| 4,351,035 | 9/1982 | Buchanan et al. | 367/14 |
| 4,641,317 | 2/1987 | Fullerton | 375/1 |
| 4,688,430 | 8/1987 | Anderson | 73/625 |
| 4,706,499 | 11/1987 | Anderson | 73/625 |
| 4,738,377 | 4/1988 | DeMoss, Jr. | 222/1 |
| 4,743,906 | 5/1988 | Fullerton | 342/27 |
| 4,809,010 | 2/1989 | Losee | 343/719 |
| 4,813,057 | 3/1989 | Fullerton | 375/37 |
| 4,817,434 | 4/1989 | Anderson | 73/625 |
| 4,872,144 | 10/1989 | Young et al. | 367/20 |
| 4,979,186 | 12/1990 | Fullerton | 375/23 |
| 5,005,418 | 4/1991 | Anderson | 73/625 |
| 5,020,374 | 6/1991 | Petroff et al. | 73/861.25 |
| 5,027,658 | 7/1991 | Anderson | 73/625 |
| 5,090,245 | 2/1992 | Anderson | 73/625 |
| 5,113,192 | 5/1992 | Thomas | 342/22 |
| 5,134,884 | 8/1992 | Anderson | 73/625 |
| 5,210,495 | 5/1993 | Hapashy et al. | 324/338 |
| 5,226,328 | 7/1993 | Petroff et al. | 73/861.25 |
| 5,229,977 | 7/1993 | Owen | 367/145 |
| 5,235,857 | 8/1993 | Anderson | 73/625 |
| 5,325,095 | 6/1994 | Vadnais et al. | 342/22 |
| 5,327,139 | 7/1994 | Johnson | 342/22 |
| 5,333,508 | 8/1994 | Petroff et al. | 73/861.25 |
| 5,363,108 | 11/1994 | Fullerton | 342/27 |
| 5,384,715 | 1/1995 | Lytton | 364/550 |
| 5,434,507 | 7/1995 | Beren et al. | 324/338 |
| 5,499,029 | 3/1996 | Bashforth et al. | 342/22 |
| 5,502,444 | 3/1996 | Kohlberg | 342/22 |
| 5,553,407 | 9/1996 | Stump | 37/348 |
| 5,644,314 | 7/1997 | Ahmad et al. | 342/22 |
| 5,673,050 | 9/1997 | Moussally et al. | 342/22 |

FOREIGN PATENT DOCUMENTS

WO 96/20417 7/1996 WIPO.

*Primary Examiner*—John B. Sotomayor
*Attorney, Agent, or Firm*—Burns, Doane, Swecker & Mathis, L.L.P.

[57] ABSTRACT

In a ground penetrating radar system, A-scan images of subsurface targets lying along the antenna boresight axis can be substantially improved and generated in real-time by employing a synthetic aperture, end-fire array, despite the inhomogeneous nature of the subsurface volume. The synthetic aperture, end-fire array is achieved by generating electromagnetic (EM) ultra-wideband impulses at a number of precise locations along the antenna boresight access, shifting the returned EM signals in the time domain according to the corresponding antenna boresight location, and then integrating the shifted, returned EM signals.

24 Claims, 4 Drawing Sheets

GROUND PENETRATING RADAR WITH SYNTHESIZED END-FIRE ARRAY

BACKGROUND

The present invention relates to time of flight (TOF) measurement systems. More particularly, the present invention relates to a ground penetrating radar (GPR) system that is capable of providing A-scan images of subsurface targets using a synthetic aperture, end-fire array.

In the past, GPR has been used for a number of diverse applications, for example, geophysical applications such as mapping subsurface strata; locating toxic waste sites for remediation; and detection and location of unexploded subsurface ordnance.

GPR systems are similar to ordinary radar systems in that both measure target range (i.e., the distance from the radar system to an intended target, or portion thereof) by determining the amount of time it takes for electromagnetic (EM) radiation to travel from the radar to the intended target and then back to the radar. In practice, however, conventional GPR systems are inherently more complicated than ordinary radar systems due to some unique problems associated with transmitting and receiving EM radiation through a subsurface medium.

The first problem is that the subsurface medium (e.g., the earth) is typically inhomogeneous. Therefore, the EM radiation in a GPR system must travel through a number of different media, for example, air, rock, sand, water, clay, and other types of subsurface mineral deposits, each with a different and unquantified dielectric constant. Hence, the propagation velocity of the EM radiation from point to point within the subsurface volume may vary dramatically and is typically unknown without first performing a detailed, time-consuming analysis of the subsurface volume.

Ordinary radars do not encounter this problem because they transmit and receive EM radiation through "free space" (i.e., air) which is a homogeneous medium with a known dielectric constant. Because the dielectric constant of air is known, the propagation velocity of the EM radiation traveling through the air is known. Therefore, the computation of target range is quickly reduced to the task of multiplying the EM radiation time-of-flight (i.e., the round trip travel time between the radar and the target) by the propagation velocity of EM radiation through air.

The second problem associated with conventional GPR is that EM radiation does not penetrate the earth as easily as it penetrates the air. In fact, some media, such as wet clay or salt water, are so absorbent that EM radiation, at the frequency ranges relevant to GPR, cannot penetrate more than a few inches. The ability to penetrate a subsurface medium is highly dependent upon the frequency of the EM radiation. More specifically, low frequencies tend to achieve greater subsurface penetration. Unfortunately, lower frequencies also result in decreased target range resolution (i.e., target range accuracy). However, range resolution is also dependent upon bandwidth. More recently, GPR systems have begun employing ultra-wideband techniques, especially ultra-wideband impulse techniques which, to some extent, improve a GPR's ability to penetrate a subsurface medium without sacrificing resolution.

Although the two above-identified problems are by no means the only problems that affect GPR performance, they are clearly two very significant problems. Regarding the problem of subsurface inhomogeneity, some GPR systems employ a brute force technique that involves determining the propagation velocities for each region in the subsurface volume. However, as one might expect, these systems tend to be unacceptably slow. Consequently, there is a need to produce a GPR system that, despite the above-identified problems, can produce a subsurface image in real or near real-time. Moreover, there is a need to provide such a system that is physically compact so that it can be utilized in a spatially limited area.

SUMMARY

The present invention involves an ultra-wideband impulse ground penetrating radar (GPR) system that employs a synthetic aperture, end-fire array. The synthetic aperture, end-fire array technique characteristically produces a very narrow beam without the need to determine the propagation velocities throughout the subsurface volume. In addition, the narrow beam significantly improves the signal-to-clutter ratio, which in turn, improves the ability of the radar to penetrate the subsurface volume.

It is, therefore, an object of the present invention to provide a GPR system that is capable of detecting subsurface objects such as mineral ore bodies and other subsurface structures.

It is another object of the present invention to provide a GPR system that can generate a real-time or near real-time A-scan image of subsurface objects despite several significant problems associated with propagating EM radiation through an unknown, inhomogeneous subsurface medium.

It is yet another object of the present invention to provide a GPR system that is capable of detecting, locating and identifying subsurface ore bodies from an area that is spatially constrained, for example, an underground mine shaft.

The aforementioned and other objects of the invention are achieved by a ground penetrating radar system comprising a transmitter for generating electromagnetic energy and an antenna coupled to the transmitter which emits and receives the electro-magnetic energy generated by the transmitter, wherein the antenna is employed as a synthetic aperture, end-fire array.

The aforementioned and other objects of the invention are also achieved by a method of generating an image of a target located in a subsurface volume. The method comprises the steps of emitting and receiving electro-magnetic energy from an antenna located at a first position along an antenna boresight axis, translating the antenna to a second position located along the antenna boresight axis, and, once again, emitting and receiving electro-magnetic energy from the antenna while the antenna is located at the second position. Then, in the time domain, the method involves shifting the return electromagnetic energy signal received at the second position as a function of the distance between the first position and the second position, and integrating the electromagnetic energy signals received at the first position and the shifted, electromagnetic energy signal received at the second position. Finally, the method involves displaying an image representing the location of the subsurface target along the antenna boresight axis.

BRIEF DESCRIPTION OF THE DRAWINGS

The objects and advantages of the invention will be understood by reading the following detailed description in conjunction with the drawings in which.

DETAILED DESCRIPTION

The present invention is an ultra-wideband (UWB), ground penetrating radar (GPR) system that overcomes the above-identified problem of propagating electromagnetic (EM) radiation through an inhomogeneous medium. The present invention overcomes this problem by employing a synthetic aperture, end-fire array, which is implemented by translating the radar antenna in free space and along the antenna boresight where the dielectric constant and, hence, the propagation velocity of EM radiation is well known.

Although only preferred embodiments are specifically illustrated and described herein, one skilled in the art will appreciate that many modifications and variations of the present invention are possible and within the purview of the appended claims without departing from the spirit and intended scope of the invention. For example, the embodiments described below primarily involve an UWB, impulse generating GPR. However, one skilled in the art will recognize that other types of GPR could form the basis of alternative embodiments of the present invention. Other types of GPR include linear FM GPR (i.e., swept frequency GPR) and stepped frequency GPR.

Figure 1:
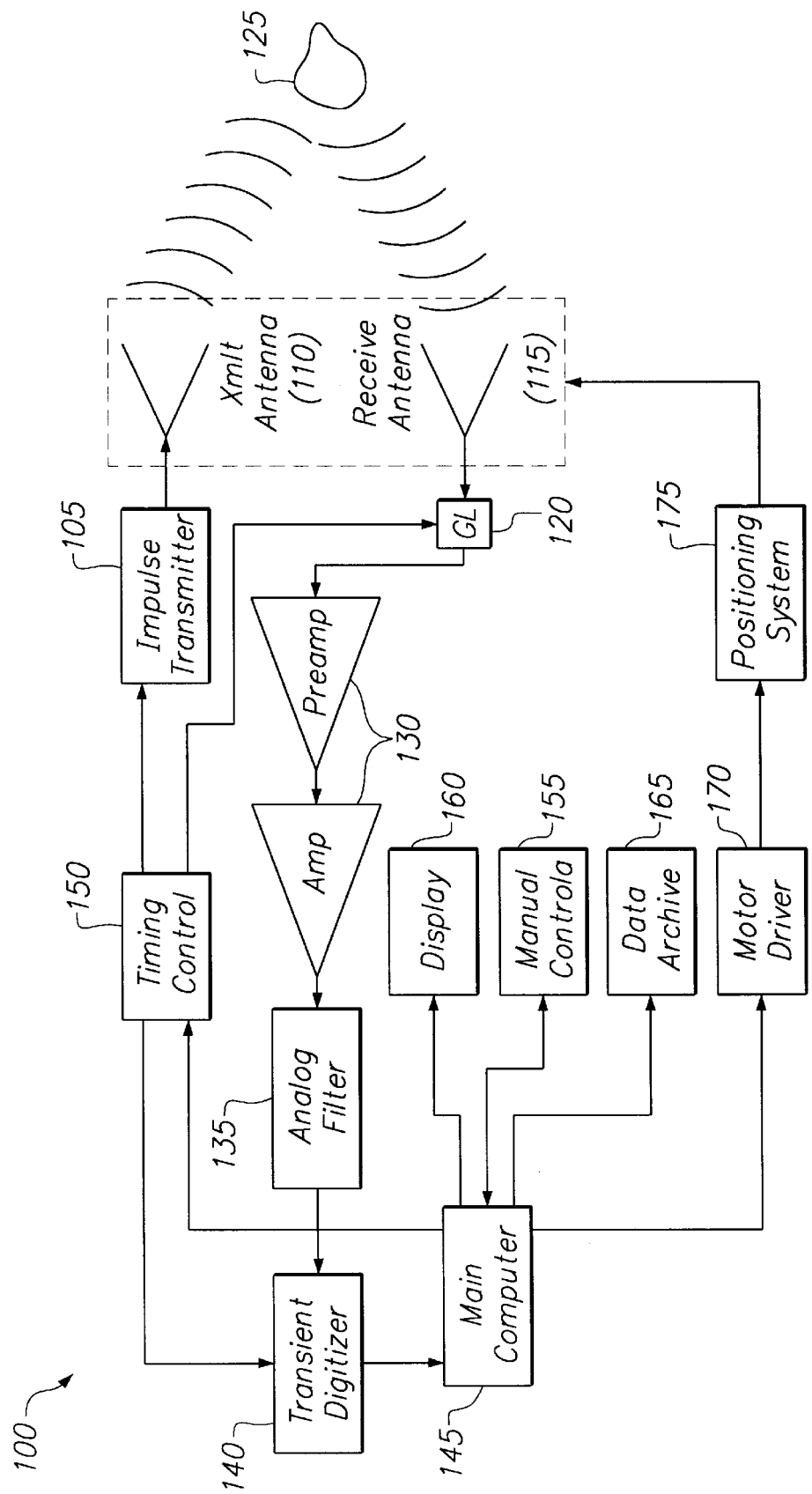
FIG. 1 is a block diagram of the present invention.

FIG. 1 shows a block diagram of an exemplary embodiment of the present invention 100. According to FIG. 1, the EM radiation is generated by an impulse transmitter 105. The impulse transmitter 105 emits UWB impulses that approximate differentiated monocycles, wherein each impulse comprises two short positive-going pulses with an intermediary negative excursion. In addition, each UWB impulse reflects a bandwidth of greater than 100 percent, which enhances target range resolution, as is well known in the art.

The exemplary embodiment illustrated in FIG. 1 also includes separate, but co-located, transmit and receive antennas 110 and 115 respectively. This antenna configuration is commonly referred to as a "bistatic" configuration. Those skilled in the art, however, will recognize that similar functionality can be achieved with a single antenna (i.e., a monostatic configuration). Connected to the receive antenna 115 is a high speed gate limiter (GL) switch 120. In a preferred embodiment, the GL switch is a high speed, gallium arsenide-based switch. This high speed switch prevents the receiver from saturating or clipping due to large, cross-fed (i.e., "leakage") signals that propagate from the transmitter antenna 110 directly into the receive antenna 115 without first penetrating or reflecting from the ground. The large, initial pulse caused by the cross-fed signals is undesirable and it is important that it be suppressed.

After the EM radiation energy reflecting back from the intended target 125 has been received, it is processed by a number of electronic devices including one or more amplifiers 130, an analog filter 135, and a transient digitizer 140. The amplifiers 130 increase the amplitude of the EM radiation energy return signal. In a preferred embodiment, the amplifier gain levels increase over time to compensate for the attenuation of the EM radiation energy return signal which increases as the range to the intended target 125 increases. The analog filter 135 removes DC offsets from the EM radiation energy signal before the signal is digitized. This, of course, is necessary in order to accurately integrate the EM radiation energy return signal with other EM radiation energy return signals. Once filtered, the EM radiation energy signal is digitized by a transient digitizer 140, so that the signal can be processed by the signal processing algorithms resident in the main computer 145.

The main computer 145 issues control signals for a timing and control circuit 150, which in turn controls the timing of the impulse transmitter 105 and the GL switch 120. The main computer 145 also issues control signals for the motor driver 170 and the positioning system 175 which translate the antennas 110 and 115 along the boresight axis, as will be described in greater detail below. The main computer 145 also accepts manual control inputs, as illustrated by block 155, and outputs images and/or status information to a display unit 160. Finally, the main computer 145 is capable of archiving data (e.g., storing image and/or status information in memory), as illustrated by block 165.

As stated, the present invention employs a synthetic aperture, end-fire array, which produces an effectively narrow antenna beamwidth. As those skilled in the art will recognize, a narrower antenna beamwidth typically results in greater signal-to-clutter ratios. The synthetic aperture, end-fire array technique also facilitates the process of coherently integrating the digitized signals which represent the EM radiation energy received from intended targets, and it facilitates decorrelating the digitized signals which represent the EM radiation energy received from unintended objects and/or clutter. By improving the coherent integration of target data and the decorrelation of unintended objects and/or clutter, the present invention is able to provide a clear measure of subsurface target location. Finally, the synthetic aperture, end-fire array facilitates the collection of EM radiation in a confined space by eliminating any need to utilize a multiple antenna array.

Figure 2:
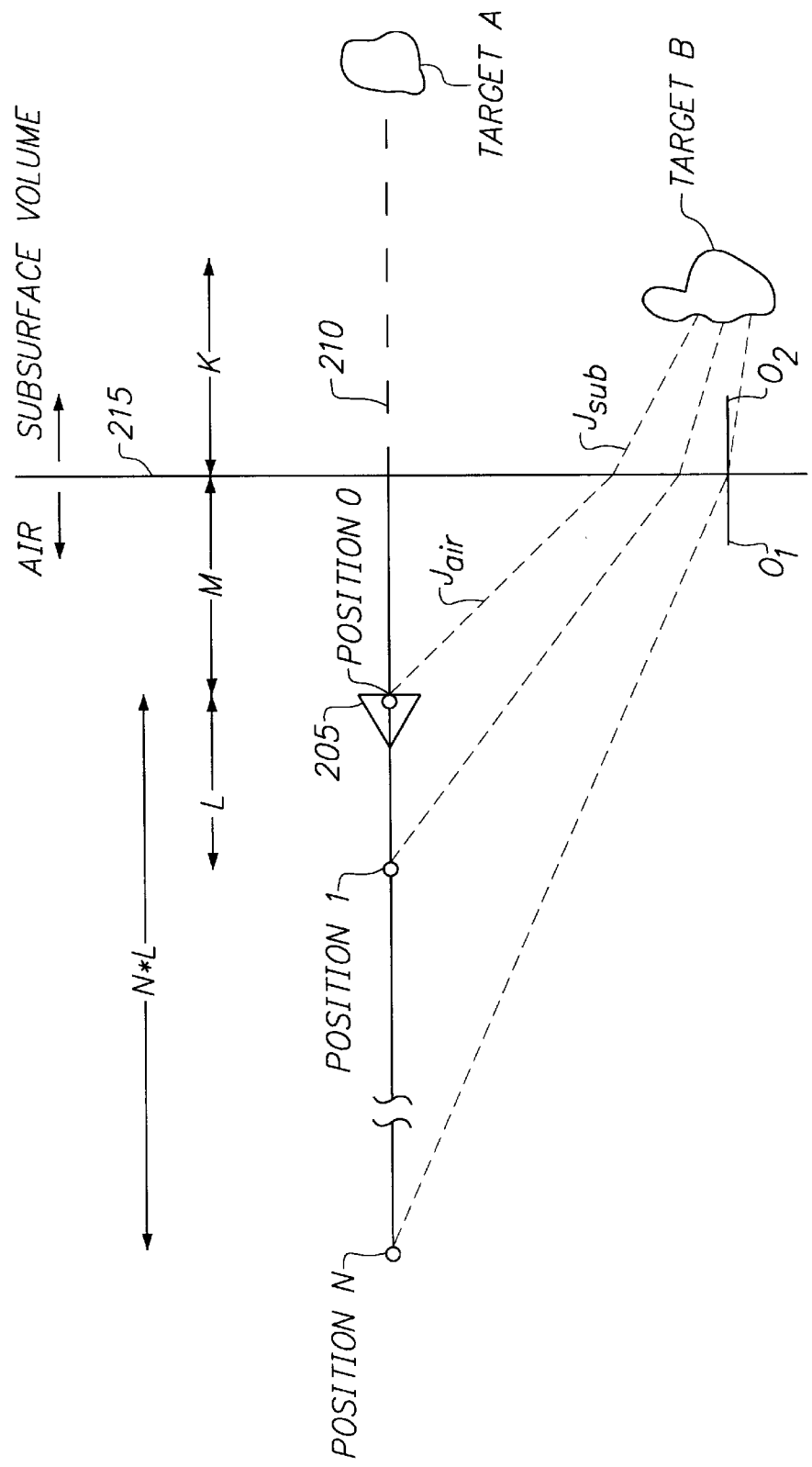
FIG. 2 is a diagram illustrating the synthetic aperture, end-fire array technique.

FIG. 2 illustrates the synthetic aperture, end-fire array technique. In accordance with an exemplary embodiment of the present invention, the radar sensor 205 (i.e., the radar antenna) is first located at a position 0 where it emits multiple ultra-wideband (UWB) impulses along the antenna boresight 210 in the direction of an intended target A. The EM radiation energy stored in the UWB impulses travels forward through free space (i.e., air), penetrates the air/subsurface volume interface 215, which is essentially perpendicular to the antenna boresight 210, propagates through the subsurface volume, intercepts both on-boresight targets (e.g., target A) and off-boresight objects (e.g., object B), and then reflects back towards the radar sensor 205. After the EM radiation energy associated with each UWB impulse is received, amplified, and digitized, the digital signals representing each of the received UWB impulses are integrated by signal processing algorithms residing in and executed by the main computer 145.

The radar sensor 205 is then translated along the antenna boresight 210 to a position 1 which is precisely located a distance L from position 0. At position 1, the radar sensor 205 once again emits multiple UWB impulses in the direction of the intended target A. As FIG. 2 illustrates, the EM radiation energy associated with the UWB impulses emitted at position 1 and traveling along the antenna boresight 210 must travel an additional distance of 2*L as compared with the EM radiation energy associated with the UWB impulses emitted at position 0. It is important to note that the on-boresight, subsurface distance K remains the same, with respect to position 0 and position 1. The on-boresight air path, M plus n*L, varies only by the distance L as the antenna is moved from position 0 to position 1, wherein n represents the antenna position and equals 0 . . . N. The off-boresight subsurface path $J_{sub}$ and the off-boresight air path $J_{air}$ also vary as the antenna is moved. The total off-boresight path length $J_{sub}$ plus $J_{air}$ changes by less than L as the antenna is moved from position 0 to position 1. The farther off-axis target B is, the less the off-boresight path length changes as the antenna is moved.

It is also important to note that the off-boresight EM radiation changes direction, in accordance with Snell's Law, when it penetrates the air/subsurface volume interface 215, as illustrated in FIG. 2. For example, if the angle of incidence $\theta_1$ is 30 degrees, the angle $\theta_2$ is determined by the following relationship:

$$\theta_2 = \arcsin(\sin 30°/\eta) \qquad (1)$$

wherein $\eta$ is the index of refraction. Depending upon the soil, $\eta$ will typically range from approximately 3 to approximately 9. As one skilled in the art will recognize, higher indices of refraction will result in smaller angular values for $\theta_2$, which further enhances the present invention's ability to decorrelate clutter and other signal returns due to off-boresight objects as will be explained in more detail below.

The digital signals representing the EM radiation energy received, while the radar sensor 205 is located at position 1, are then shifted in the time domain by the signal processing algorithms, and by an amount that is equivalent to the time required for EM radiation to propagate a distance of 2*L through free space (i.e., air). Once shifted, the digital signals representing the EM radiation energy received at position 1 and the digital signals representing the EM radiation energy received at position 0 will be aligned in the time domain (i.e., coherent) only with respect to EM radiation energy returns corresponding to targets lying along the antenna boresight 210. As will be explained below, the EM radiation energy returns that are associated with objects lying off-boresight will not be aligned as a result of the time-shift procedure. The digital signals representing the EM radiation energy received at position 1 are then integrated with the digital signals representing the EM radiation energy received at position 0. Accordingly, the digital signals representing the EM radiation energy associated with targets lying along the antenna boresight 210 will be coherently integrated (i.e., added) during the integration process while all other non-coherent returns will be decorrelated during the integration process.

More generally, the radar sensor 205 is translated to a number of positions 0 . . . N along the antenna boresight 210. At each position 0 . . . N, the digital signals representing the EM radiation energy returns are shifted in the time domain by an amount equivalent to the time required for EM propagating along the antenna boresight 210 to travel the additional round trip distance of 2*n*L, where n equals 0 . . . N. As stated above, the digital signals are then integrated by the signal processing algorithms in the main computer 145.

Figure 3A:
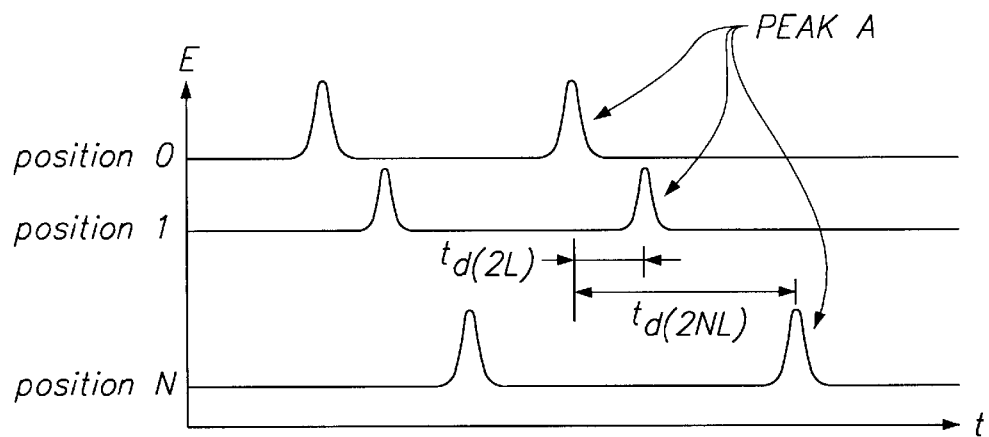
FIGS. 3A, 3B and 3C are timing diagrams which depict the shifting and integration of the radar returns.

FIG. 3A depicts three exemplary EM signal returns: a first corresponding to the EM signal received at position 0, a second corresponding to the EM signal received at position 1, and a third corresponding to the EM signal received at position N. For purposes of illustration, the signals in FIG. 3A are depicted as analog signals; however, one skilled in the art will readily understand that the signals would be digitized by the transient digitizer 140 prior to signal processing. In FIG. 3A, Peak A represents that portion of each EM signal associated with EM energy reflecting from target A, which lies along the antenna boresight 210. With respect to the EM signals corresponding to positions 1 and N, peak A is shifted in the time domain by an amount of time $t_d(2L)$ and $t_d(2NL)$ respectively, wherein the values of $t_d(2L)$ and $t_d(2NL)$ represent the amount of time that it will take the EM radiation propagating along the antenna boresight 210 to travel the additional distance of 2*L and 2*N*L respectively. As the additional distances travelled by the EM radiation occurs in free space, the additional time $t_d(2L)$ and $t_d(2NL)$ is computed by the signal processing algorithms in accordance with the following relationship:

$$t_d = (2*M*L)/c \qquad (2)$$

where L is the distance between successive positions 0 . . . N lying along the antenna boresight 210, c is the velocity of light in air, and M varies from 0 to N.

Figure 3B:
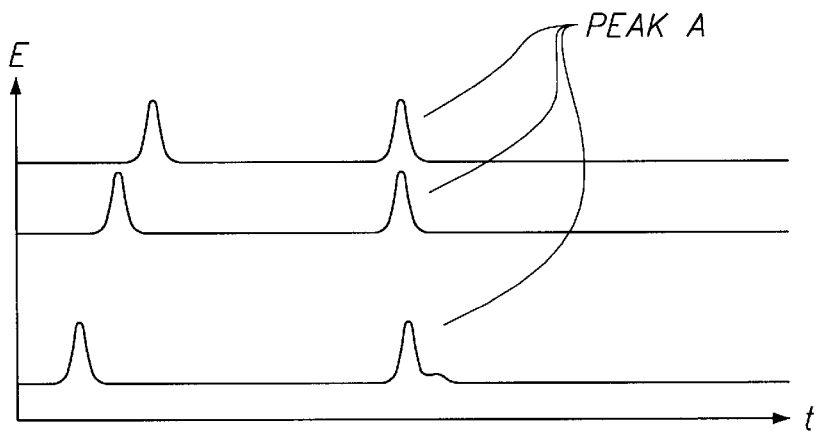

FIG. 3B illustrates the same three exemplary EM signals after being shifted based on the corresponding time delay $t_d(2L)$ and $t_d(2NL)$ respectively. Note, that by shifting the signals accordingly, peak A for each signal becomes aligned with respect to time. Conversely, those portions of the EM signals associated with reflections due to off-boresight objects (e.g., object B), do not align after the signals are shifted. That is because the distance traveled by the EM radiation propagating along a path other than the antenna boresight 210 (e.g., along a path that intercepts object B) will vary by an amount other than 2*N*L.

Figure 3C:
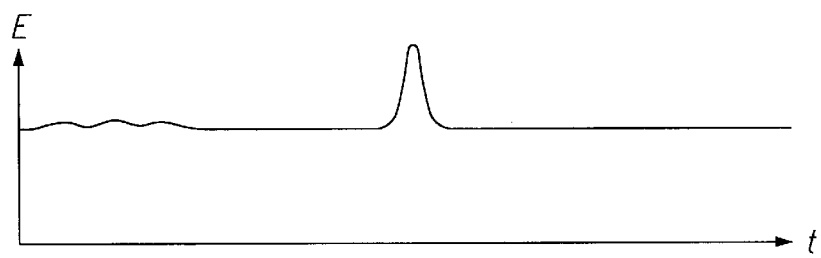

FIG. 3C illustrates the resultant signal after shifting the received EM signals and then integrating them with respect to position. More particularly, FIG. 3C, shows that the coherent EM energy returns, such as those corresponding to target A, will be added during the integration process. At the same time, the non-coherent returns, such as those corresponding to object B, will be decorrelated during the integration process by the signal processing algorithms.

As explained above, the air/subsurface volume interface 215 will cause the EM radiation line-of-sight to bend, in accordance with Snell's Law, upon penetrating the subsurface volume for all axes other than the antenna boresight 210. That is because the antenna boresight 210 is, as mentioned above, perpendicular to the air/subsurface volume interface 215 and because the dielectric constant for the subsurface volume is greater than the dielectric constant for air. This bending of the EM radiation line-of-sight, in turn, causes off-boresight objects (e.g., object B) to appear further from the antenna boresight 210 than they really are. The change in dielectric constant and the bending of the EM radiation effectively synthesizes a more narrow antenna bandwidth, which in turn enhances the decorrelation of EM radiation energy reflecting back from off-boresight objects.

Figure 4A:
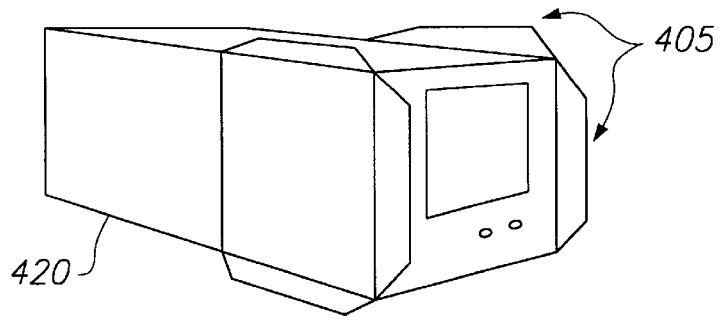
FIGS. 4A, 4B and 4C illustrate the exterior configuration of the present invention.
Figure 4B:
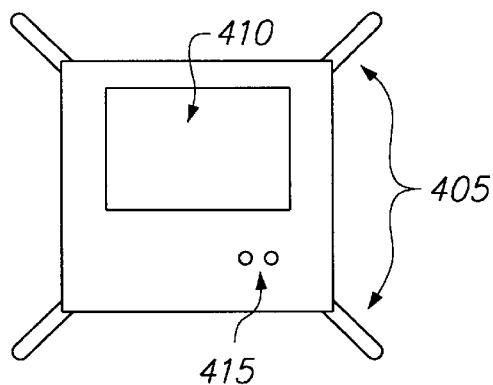

FIGS. 4A and 4B illustrate a perspective view and a front view of the exterior configuration of the present invention, in accordance with an exemplary embodiment. Together, these figures show that the exterior design includes a number of handles 405 which are used for manually lifting and positioning the radar, which is small enough and light enough that it can be lifted and placed in position by one person. The figures also show that the exterior design includes a built-in computer monitor 410 along with a number of standard controls 415 for adjusting the monitor display. On the distal end, the exterior design comprises a radome 420 which surrounds and protects the radar antenna. The near end houses all of the supporting electronic circuitry, such as the amplifiers 130, the analog filter 135, the transient digitizer 140, and the main computer 145.

Figure 4C:
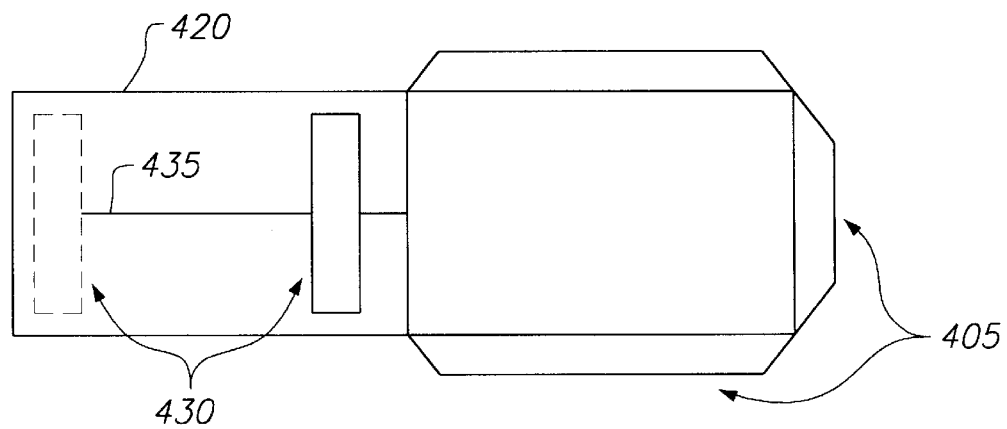

FIG. 4C shows a side view of the present invention, with the interior of the radome 420 exposed. As stated above, to implement the synthetic aperture, end-fire array technique, the radar antenna is translated along the antenna boresight. FIG. 4C shows that this is actually accomplished by translating the radar antenna 430 along a guide rail 435, wherein the guide rail 435 is coincident with the antenna boresight 210. A servo motor unit (not shown), housed in the near-end compartment, is used to move the radar antenna 430 along the guide rail 435.

The present invention provides a number of advantages over prior conventional GPR systems. First, the synthetic aperture, end-fire array technique employed by the present invention makes it unnecessary to precompute the propagation characteristics for each region within the subsurface volume. This, in turn, results in relatively simple signal processing routines. Therefore, on-boresight, A-scan images of subsurface targets are achieved in real-time with a relatively limited amount of computation. Second, the present invention provides for effectively narrow beamwidths, which are otherwise difficult to achieve with UWB impulses. Third, the antenna beam-forming requirements are minimal, further facilitating a compact design to support the inventions use in a spatially constrained environment.

What is claimed is:

1. A ground penetrating radar system comprising:
   a transmitter for generating electromagnetic energy;
   an antenna coupled to said transmitter for emitting and receiving the electro-magnetic energy;
   servo means for translating said antenna along an antenna boresight axis, and for employing said antenna as a synthetic aperture, end-fire array; and
   signal processing means for integrating an array of data representing the electro-magnetic energy received at different antenna positions located along the antenna boresight axis, wherein said signal processing means includes means for frequency shifting the data as a function of a corresponding position along the boresight axis and means for summing the array of frequency shifted data.

2. The ground penetrating radar system in accordance with claim 1, wherein said transmitter is an impulse transmitter.

3. The ground penetrating radar system in accordance with claim 2, wherein said transmitter generates ultra-wideband impulses.

4. The ground penetrating radar system in accordance with claim 1, wherein said transmitter generates linear FM signals.

5. The ground penetrating radar system in accordance with claim 1, wherein said transmitter generates stepped frequency signals.

6. The ground penetrating radar system in accordance with claim 1, further comprising:
   a display device for presenting real-time, A-scan images of subsurface targets based on the integrated signals.

7. The ground penetrating radar system in accordance with claim 1, wherein said antenna comprises:
   a transmit antenna; and
   a receive antenna,
   wherein said transmit and receive antenna are collocated in a bistatic configuration.

8. The ground penetrating radar system in accordance with claim 1, wherein said antenna has a monostatic configuration.

9. A ground penetrating radar system comprising:
   a transmit antenna;
   a receive antenna, co-located with said transmit antenna, for receiving electro-magnetic energy return signals;
   servo means for translating the transmit and receive antennas to a plurality of precise locations along an antenna boresight axis;
   a transmitter for generating electro-magnetic energy at each of the plurality of precise locations along the antenna boresight axis, thereby employing the transmit and receive antenna as a synthetic aperture, end-fire array; and
   signal processing means for aligning and summing the electro-magnetic energy signals received at different boresight axis locations of the receive antenna.

10. The ground penetrating radar system in accordance with claim 9, wherein the signal processing means comprises:
    means for shifting each electro-magnetic energy signal as a function of the different boresight axis location; and
    means for integrating the shifted electro-magnetic energy signals.

11. The ground penetrating radar system in accordance with claim 10, further comprising:
    display means for producing an A-scan image of a subsurface volume as a function of the integrated electro-magnetic energy signals.

12. The ground penetrating radar system in accordance with claim 9, wherein said transmitter is an ultra-wideband impulse transmitter.

13. The ground penetrating radar system in accordance with claim 12, wherein the ultra-wideband impulse transmitter transmits a plurality of ultra-wideband impulses at each of the plurality of precise locations along the antenna boresight axis.

14. The ground penetrating radar system in accordance with claim 9, further comprising amplifier means for automatically adjusting an amplifier gain level as a function of time of flight.

15. A method of generating an image representing the location of subsurface target comprising the steps of:
    emitting electro-magnetic energy from an antenna located at a first position along an antenna boresight axis and receiving a return electro-magnetic energy signal with the antenna;
    translating the antenna to a second position located along the antenna boresight axis;
    emitting electro-magnetic energy from the antenna while the antenna is located at the second position and receiving a return electro-magnetic energy signal with the antenna;
    in the time domain, shifting the return electro-magnetic energy signal received at the second antenna boresight position as a function of the distance between the first position and the second position;
    integrating the electro-magnetic energy signals received at the first antenna boresight position and the shifted, electro-magnetic energy signal received at the second antenna boresight position; and
    displaying an image representing target location based on the integrated electro-magnetic energy signals received at the first antenna boresight position and the second antenna boresight position.

16. A method in accordance with claim 15, wherein each of the steps involving emitting and receiving electro-magnetic energy comprise the step of:
    emitting and receiving an ultra-wideband impulse of electro-magnetic energy.

17. A method in accordance with claim 15, wherein each of the steps involving emitting and receiving electro-magnetic energy comprise the step of:
    emitting and receiving ultra-wideband, linear FM signals.

18. A method in accordance with claim 15, wherein each of the steps involving emitting and receiving electro-magnetic energy comprise the step of:

emitting and receiving ultra-wideband, stepped frequency signals.

19. A method of using a ground penetrating radar system to generate A-scan images of targets located in a subsurface volume comprising the steps of:

emitting a plurality of electro-magnetic impulses from an antenna located at a first position along an antenna boresight axis;

receiving a return electro-magnetic energy signal for each of the plurality of electro-magnetic impulses with the antenna located at the first position along the antenna boresight axis;

digitizing the return electro-magnetic energy signals;

integrating the digitized return electro-magnetic energy signals;

translating the antenna to a second position located along the antenna boresight axis a distance L from the first position;

emitting a second plurality of electro-magnetic impulses from the antenna located at the second position;

receiving a return electro-magnetic energy signal for each of the second plurality of electro-magnetic impulses with the antenna located at the second position along the antenna boresight axis;

digitizing the return electro-magnetic energy signals received at the second position;

in the time domain, shifting the digitized return electro-magnetic energy signal received at the second position as a function of the distance L between the first position and the second position along the antenna boresight axis; and integrating the shifted, digitized return electro-magnetic energy signals received at the second position with the digitized return electro-magnetic energy signals received at the first position.

20. A method in accordance with claim 19, wherein the antenna boresight axis is perpendicular to a surface separating free space and the subsurface volume.

21. A method in accordance with claim 19, wherein the electro-magnetic impulses are ultra-wideband impulses.

22. A method in accordance with claim 19, wherein the antenna comprises:

a transmit antenna; and a receive antenna, wherein the transmit and receive antennas are collocated in a bistatic configuration.

23. A method in accordance with claim 19, wherein the antenna comprises a monostatic configuration.

24. A method in accordance with claim 19, further comprising the step of:

displaying an image of a target lying along the antenna boresight axis based on the integrated electro-magnetic energy signals received at the first position and the second position.

* * * * *